(12) United States Patent
Åberg et al.

(10) Patent No.: US 11,632,501 B2
(45) Date of Patent: Apr. 18, 2023

(54) CONTROLLING SETTINGS OF AN IMAGE SENSOR DEVICE IN AN EYE TRACKING SYSTEM

(71) Applicant: Tobii AB, Danderyd (SE)

(72) Inventors: Viktor Åberg, Danderyd (SE); Niklas Ollesson, Danderyd (SE); Anna Redz, Danderyd (SE); Magnus Ivarsson, Danderyd (SE)

(73) Assignee: Tobil AB, Danderyd (SE)

( * ) Notice: Subject to any disclaimer, the term of this patent is extended or adjusted under 35 U.S.C. 154(b) by 93 days.

(21) Appl. No.: 17/128,896

(22) Filed: Dec. 21, 2020

(65) Prior Publication Data

US 2021/0258464 A1 Aug. 19, 2021

(30) Foreign Application Priority Data

Dec. 20, 2019 (SE) .................................... 1951519-6

(51) Int. Cl.
*H04N 5/235* (2006.01)
*G06F 3/01* (2006.01)

(52) U.S. Cl.
CPC ........... *H04N 5/2353* (2013.01); *G06F 3/013* (2013.01); *H04N 5/2351* (2013.01)

(58) Field of Classification Search
CPC ............... H04N 5/2353; H04N 5/2351; H04N 5/23219; H04N 5/345; H04N 5/3532; H04N 5/232; G06F 3/013
See application file for complete search history.

(56) References Cited

U.S. PATENT DOCUMENTS 5,671,447 A * 9/1997 Tokunaga .............. G03B 13/02
396/51
9,465,990 B2 10/2016 Ronnecke et al.
(Continued)

FOREIGN PATENT DOCUMENTS

WO 2019230093 12/2019
WO 2019230093 A1 12/2019

OTHER PUBLICATIONS

Swedish Search Report and Written Opinion of 1951519-6, dated Oct. 23, 2020.
(Continued)

*Primary Examiner* — Jason A Flohre
(74) *Attorney, Agent, or Firm* — Noréns Patentbyrå AB

(57) ABSTRACT

There is provided a method, system, and non-transitory computer-readable storage medium for controlling the exposure settings of a rolling shutter image sensor device with global reset. This is achieved by obtaining a first image captured by the image sensor device at a current exposure setting that comprises a partial readout parameter representing a number image parts for partial readout by the image sensor device; determining an intensity value of the first image, comparing the intensity value of the first image to a desired intensity value. If the intensity values differ more than an allowed deviation, an updated number of image parts for partial readout is determined based on the current number of image parts and the intensity value of the first image. Thereafter, the current exposure setting is updated by setting the value of the partial readout parameter to the updated number of image parts.

20 Claims, 8 Drawing Sheets

(56) References Cited

U.S. PATENT DOCUMENTS

| | | | |
|---|---|---|---|
| 2002/0039433 A1* | 4/2002 | Shin .................... | G06V 40/18 382/117 |
| 2014/0063221 A1* | 3/2014 | Mohanakrishnan ... | G06V 40/18 348/78 |
| 2015/0199559 A1 | 7/2015 | Sztuk et al. | |
| 2015/0312497 A1 | 10/2015 | Aldridge et al. | |
| 2016/0248971 A1 | 8/2016 | Tall et al. | |
| 2018/0165537 A1* | 6/2018 | Ackerman ............ | H04N 7/181 |
| 2018/0204111 A1* | 7/2018 | Zadeh ................. | G06N 3/0436 |
| 2020/0278539 A1* | 9/2020 | Petljanski ............. | G09G 3/003 |

OTHER PUBLICATIONS

U.S. Appl. No. 17/128,896, "Non-Final Office Action", dated May 25, 2022, 16 pages.
SE1951519-6, "Search Report and Written Opinion", dated Oct. 23, 2020, 7 pages.

* cited by examiner

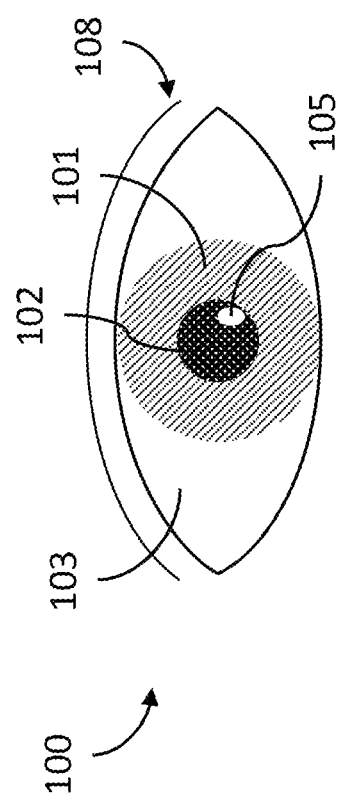
FIG. 1
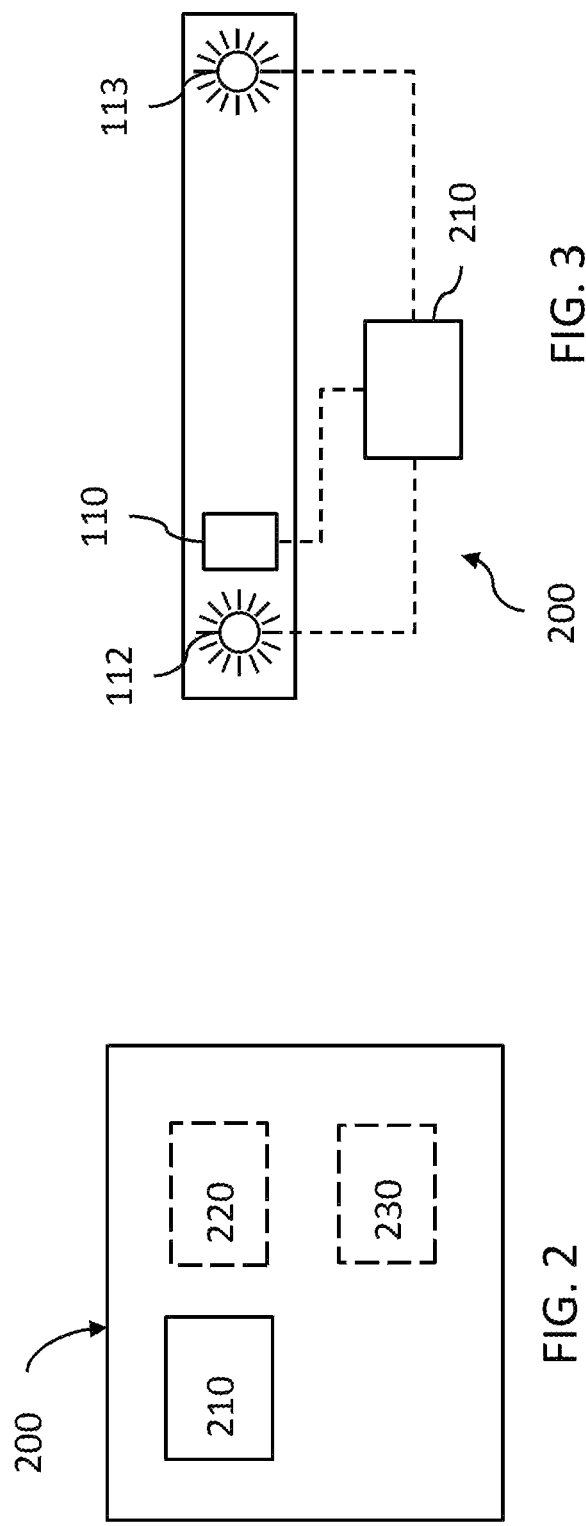
FIG. 3
FIG. 2

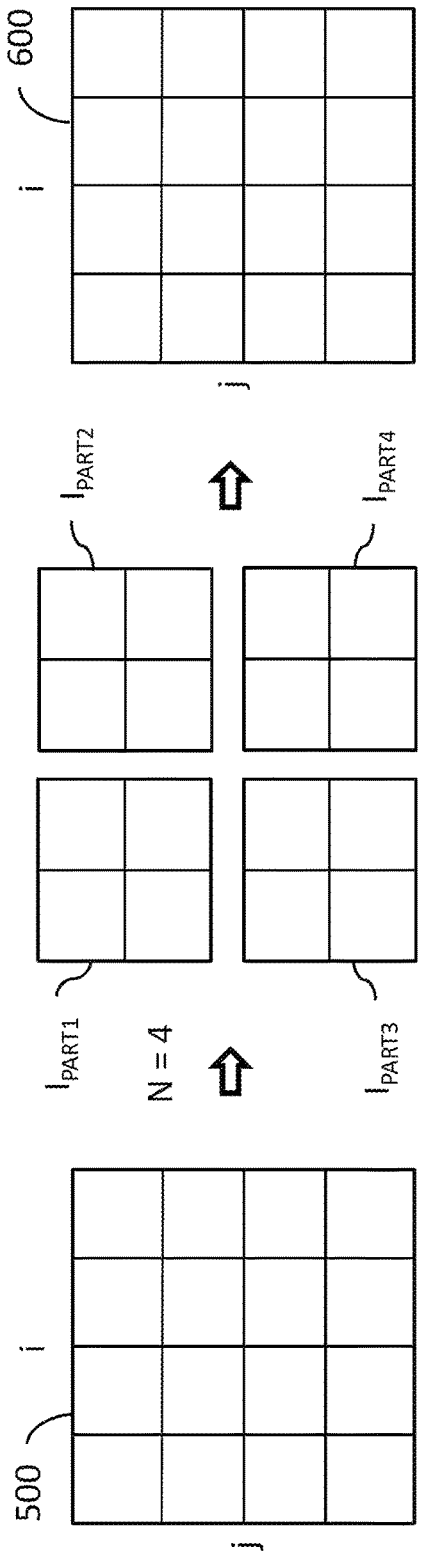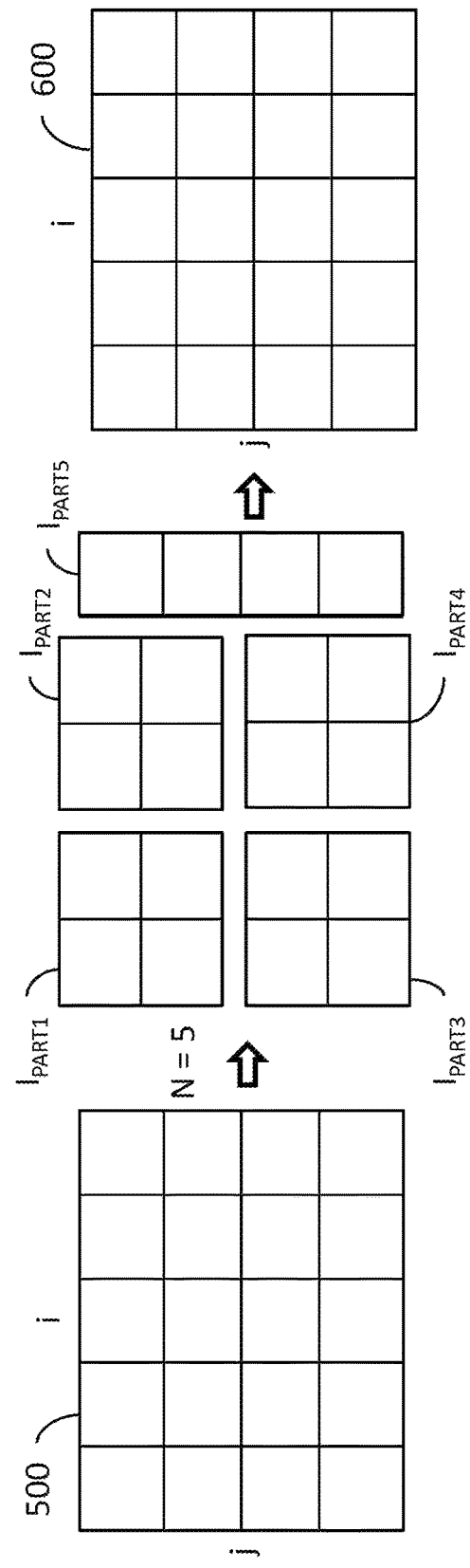
FIG. 9
FIG. 10

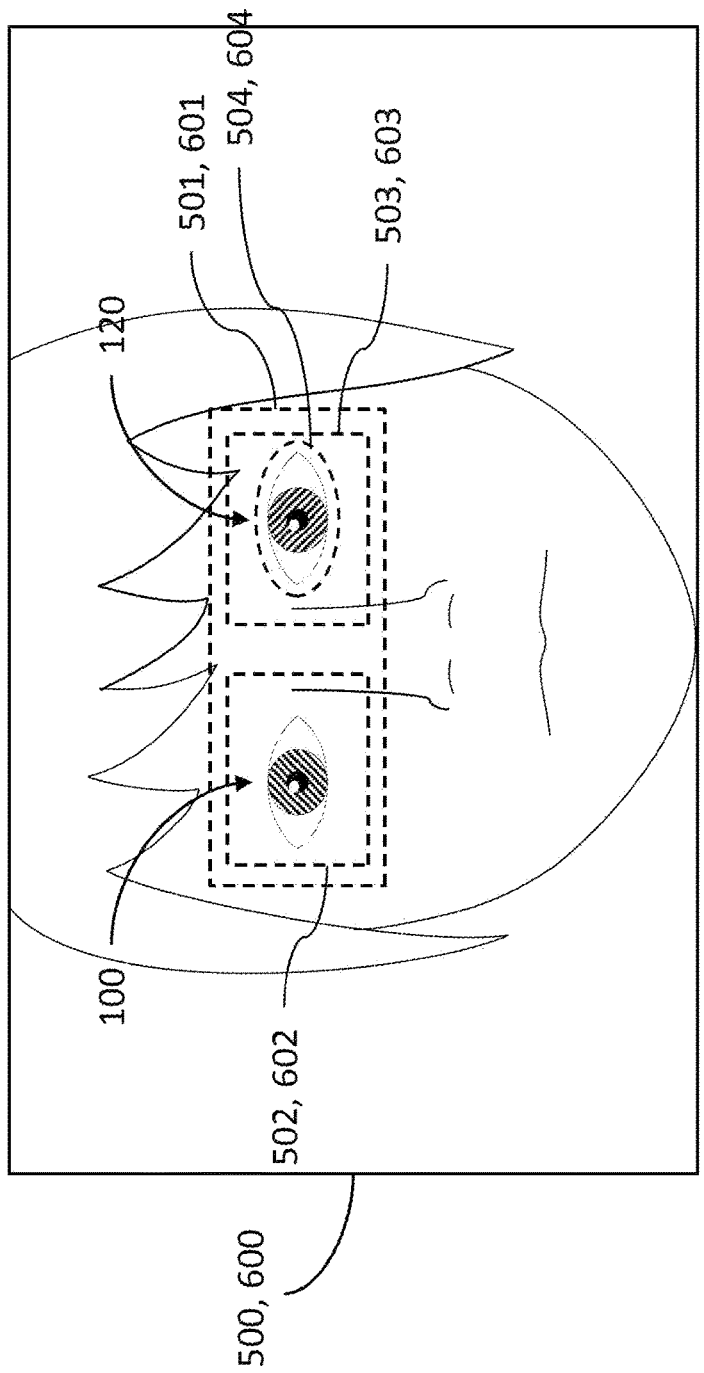
FIG. 11
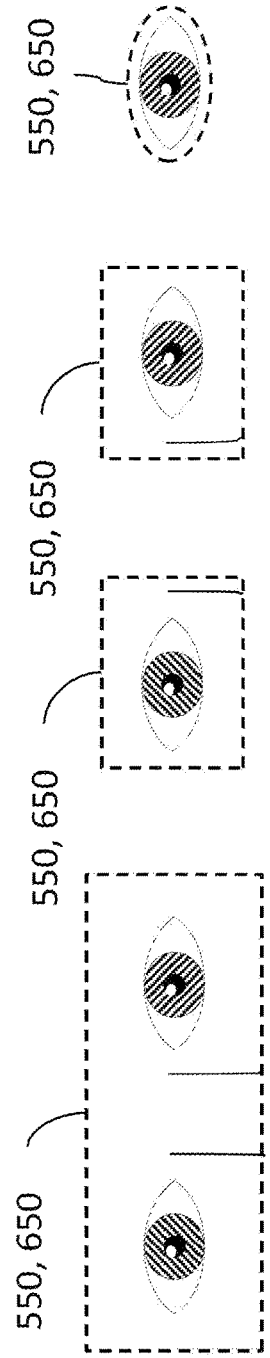
FIG. 12A
FIG. 12B
FIG. 12C
FIG. 12D

CONTROLLING SETTINGS OF AN IMAGE SENSOR DEVICE IN AN EYE TRACKING SYSTEM

CROSS-REFERENCE TO RELATED APPLICATION

The present application claims benefit to Swedish patent application No. 1951519-6, filed Dec. 20, 2019, entitled "CONTROLLING SETTINGS OF AN IMAGE SENSOR DEVICE IN AN EYE TRACKING SYSTEM", and is hereby incorporated by reference in its entirety.

TECHNICAL FIELD

The present invention relates generally to a method for controlling readout from a digital image sensor. Specifically, the present disclosure relates to controlling an eye tracking system to achieve reliable eye detection in images captured by an image sensor device associated with the eye tracking system by controlling the readout from the digital image sensor.

The invention also relates to a system comprising a digital image sensor, wherein the system is configured to control the readout from the image sensor using the method. Further, the invention relates to a computer program for carrying out the method.

BACKGROUND

Digital image sensors are widely used in different areas of technology for capturing images.

For some applications, such as in systems configured for face recognition and eye tracking, the complexity, and thus also the cost, of the image sensor and the electronics related to it should be kept at a low level.

A first type of digital image sensor is configured with a global shutter and configured for global reset. This means that all pixels in the sensor are exposed simultaneously and reset simultaneously. This type of digital image sensor functions well for most applications but is relatively expensive making it unsuitable for face recognition and eye-tracking applications. A second type of sensor is configured with a rolling shutter and configured for global reset. This means that is the sensor reads one pixel line (row or column) at a time and resets all pixels simultaneously. This type of sensor introduces the problem with the exposure as the last lines of the matrix that are read are exposed for a longer time. This may lead to problems with overexposure and underexposure of pixels in the image. If there is a lot of ambient light surrounding the sensor, which may for example be the case in an outdoor environment with sunlight, there is typically a problem with the captured images being overexposed, resulting in saturated pixels. Saturated pixels in images means loss of image information, which is a problem if the captured image is to be further processed and information is to be retrieved from the image, for example by an eye tracking system performing eye detection based on the image.

Several different eye tracking systems are known in the art. Such systems may for example be employed to allow a user to indicate a location at a computer display by looking at that point. The eye tracking system may capture images of the user's face, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience. Therefore, several schemes have been proposed for mitigating the negative effects of different types of errors or inaccuracies that may occur in eye tracking systems.

When performing eye tracking, the first step is to determine the position of one or both eyes in the image. Determination of eye position may be done using image processing methods, using a neural network trained on similar images, a combination of the two, or any other suitable eye detection method known in the art. Irrespective of which eye detection method is used, the accuracy of the result will at least in part depend on the quality of the images in which the eye detection is performed. Of course, if the eye tracking system cannot perform eye detection reliably, it will not be possible to perform robust eye tracking, and the user experience will be suffering.

Hence, there is a need for solutions that aim at optimizing the images captured by an image sensor associated with an eye tracking system for eye tracking purposes.

It would therefore be desirable to provide further systems and methods addressing this issue.

SUMMARY

A general object of the present disclosure is to address at least one of the issues described above.

One object of the present disclosure is to provide a computer implemented method and a computer program for controlling a digital image sensor device, comprising a plurality of pixels, such that the image read from the image sensor device is dynamically adapted to the ambient light.

Another object of the present invention is to provide a computer implemented method and a computer program for controlling a digital image sensor device, comprising a plurality of pixels, such that readout is performed in such a way that saturation and/or underexposure of the image is avoided.

A further object of the present invention is to provide a system comprising a processor and a digital image sensor device, wherein one of the above objects is achieved.

At least one of these objects is achieved with a computer implemented method, a computer program and a system according to the independent claims.

Further advantages are achieved with the features of the dependent claims.

One important factor in capturing images that are to be subjected to eye detection is the exposure of the image, wherein an over-exposed or under-exposed image may lead to the eye detection algorithm, neural network, or the like not being able to distinguish an eye present in the image from its surroundings. Therefore, in order to improve the reliability and accuracy of an eye tracking system, and hence improve the user experience, it is important that the image sensor(s) of the eye tracking system captures well-exposed images, i.e. not too saturated images or too dark images.

A further object is to provide improved control of an eye tracking system in order to optimize its performance, i.e. the eye tracking result, under different lighting conditions. This is suitable achieved by embodiments presented herein as all embodiments improve the exposure settings to optimize the exposure of the eye region/eye area under the current light conditions. Furthermore, embodiments herein wherein the exposure control is performed repeatedly suitably provide continuous adaptation of the exposure settings to the current light conditions.

Even though numerous solutions exist for controlling exposure and other parameters for image sensor devices in general, typically used to obtain improved image quality, none of these aims to control an image sensor of associated with an eye tracking system with the aim of capturing images optimized for eye tracking.

When applying an exposure control algorithm based on an entire image, there's a substantive risk that one or more parts of the image will still end up too dark or too bright/saturated. If an eye is comprised in such a part of the image, the eye may consequently be saturated, over-exposed, or under-exposed even after exposure control has been applied. In other words, if exposure control is based anything but the image parts comprising an eye or eyes and its immediate surroundings, the result will, as exemplified herein in connection with the figures, be inferior with regard to eye detection and eye tracking purposes. Therefore, an additional object of the present disclosure that achieved by some embodiments described herein is to control an eye tracking system to achieve reliable eye detection in images captured by an image sensor device associated with the eye tracking system by controlling the readout from the digital image sensor. With this in mind, the inventors have realized that what is needed to ensure more reliable eye tracking performance is an eye based exposure control applied to the image sensor device of the eye tracking system that captures images for eye detection and further processing within the eye tracking system. An exposure control based solely on the eye region/eye area according to some embodiments herein suitably adapt and optimize the image sensor device exposure settings such that the eye of the user of the eye tracking system will be well exposed in subsequent images captured by the image sensor device, regardless of the quality of the remaining parts of the captured image. Thereby, reliable eye detection is enabled. Since the only part of these images that is of interest for eye detection and eye tracking purposes is the eye are/eye region, the loss of information in other parts of the image is of no importance. Also, the captured images are not intended to be viewed by a human observer, whereby the visually perceived quality is irrelevant.

According to a first aspect, the objects are achieved by a method for controlling the exposure settings of an image sensor device associated with an eye tracking system, the image sensor device being a rolling shutter image sensor device with global reset comprising an image sensor of $i*j$ pixels. The method comprises obtaining, in the eye tracking system, a first image comprising $i*j$ pixels captured using the image sensor device at a current exposure setting, wherein the current exposure setting comprises a partial readout parameter, PR, having a value that corresponds to a number, N, of image parts, $I_{PART(1 \ldots N)}$, for partial readout by the image sensor device, the number of image parts, N, being an integer $\geq 1$. The method further comprises determining, by processing circuitry in the eye tracking system, an intensity value, $I_1$, of the first image and comparing, by the processing circuitry, the intensity value, $I_1$, of the first image to a preset desired intensity value, $I_{des}$. If the intensity value, $I_1$, of the first image differs more than a preset allowed deviation, d, from the preset desired intensity value, $I_{des}$ the method comprises determining, by the processing circuitry, an updated number, $N_{updated}$, of image parts for partial readout by the image sensor device based on the current number of image parts and the intensity value, $I_1$, of the first image, the updated number of image parts, $N_{updated}$ being an integer $\geq 1$, and updating, by the processing circuitry, the current exposure setting by setting the value of the partial readout parameter, PR, to the updated number, $N_{updated}$, of image parts.

The method may comprise performing the method steps above repeatedly until the intensity value, $I_1$, of the first image is within the preset allowed deviation, d, from the preset desired intensity value, $I_{des}$.

In some embodiments, the method further comprises reading out a number of image parts, $I_{PART(1 \ldots N)}$, one at a time, by the image sensor device, wherein the number of image parts corresponds to the value of the partial readout parameter, PR; and generating a second image by combining, by the processing circuitry, the read out image parts, $I_{PART(1 \ldots N)}$, into a combined image of $i*j$ pixels.

Determining, by the processing circuitry, the updated number, $N_{updated}$, of image parts for partial readout by the image sensor device based on the current number of image parts and the intensity value, $I_1$, of the first image may comprise obtaining, by the processing circuitry, a factor $\alpha$, the factor $\alpha$ being a numeric value; and if $I_{des} > I_1$, setting, by the processing circuitry, the updated number, $N_{updated}$, of image parts to: $N_{updated} = \text{round}(N*\alpha)$; or if $I_{des} < I_1$, setting, by the processing circuitry, the updated number, $N_{updated}$, of image parts to: $N_{updated} = \text{round}(N/\alpha)$.

Determining, by the processing circuitry, the updated number, $N_{updated}$, of image parts for partial readout by the image sensor device based on the current number of image parts and the intensity value, $I_1$, of the first image may in other embodiments comprise determining, by the processing circuitry, a factor $\alpha = I_{des}/I_1$; and setting, by the processing circuitry, the updated number, $N_{updated}$, of image parts to: $N_{updated} = \text{round}(N*\alpha)$.

Obtaining the factor $\alpha$, by the processing circuitry, may comprise receiving input indicative of the factor $\alpha$ via a user input device. Alternatively, obtaining the factor $\alpha$, by the processing circuitry, may comprise receiving or retrieving a preset factor $\alpha$ from a memory comprised in or communicatively connected to the eye tracking system.

The image parts for partial readout by the image sensor device may each comprise the same number of pixels and have the same shape. Alternatively, the image parts for partial readout by the image sensor device may not comprise the same number of pixels or have the same shape.

In some embodiments the method comprises setting, by the processing circuitry, the intensity value, $I_1$, of the first image to the $X^{th}$ percentile of a histogram of the intensities of the first image, X being a preset percentage between 0% and 100%. In one or more of these embodiments, X is 98%, whereby the intensity value, $I_1$, of the first image is set to the value of the $98^{th}$ percentile of the histogram. In other of these embodiments, X is 50%, whereby the intensity value, $I_1$, of the first image is set to the value of the $50^{th}$ percentile of the histogram. In yet other of these embodiments, X is 0%, whereby the intensity value, $I_1$, of the first image is set to the value of the $0^{th}$ percentile of the histogram. In still other of these embodiments, X is 100%, whereby the intensity value, $I_1$, of the first image is set to the value of the $100^{th}$ percentile of the histogram.

In some embodiments, the intensity value, $I_1$, of the first image is set to the mean value of the intensities of the first image.

The image parts, $I_{PART(1 \ldots N)}$, are non-overlapping.

In some embodiments, the method may comprise performing, by the eye tracking system, eye detection in the first image.

Performing eye detection in the first image, by the eye tracking system, may in one or more embodiment comprise determining, by the processing circuitry, at least one first region of interest, ROI, in the first image, wherein each of the at least one first ROI comprises a group of pixels in the first image representing at least one part of an eye, wherein the at least one part of an eye comprises at least one glint, at least one pupil, a part of at least one iris, a part of at least one sclera, and/or a part of at least one eye lid.

The method according to any of the embodiments wherein eye detection is performed in the first image may further comprise: obtaining, by the processing circuitry, at least one intermediate image after obtaining the first image but before obtaining the second image, wherein the intermediate image comprises the at least one first ROI; and performing, by the eye tracking system, eye tracking in each of the at least one intermediate image based on one or more of the at least one part of the eye comprised in the at least one first ROI depicted in each of the at least one intermediate image, respectively.

In some embodiments, the method may comprise performing, by the eye tracking system, eye detection in the second image.

Performing eye detection in the second image, by the eye tracking system, may in one or more embodiment comprise determining, by the eye tracking system, at least one second region of interest, ROI, in the second image, wherein each of the at least one second ROI comprises a group of pixels in the second image representing at least one part of an eye, wherein the at least one part of an eye comprises at least one glint, at least one pupil, a part of at least one iris, a part of at least one sclera, and/or a part of at least one eye lid.

The method according to any of the embodiments wherein eye detection is performed in the second image may further comprise: obtaining, by the processing circuitry, at least one subsequent image after obtaining the second image, wherein the subsequent image comprises the at least one second ROI; and performing, by the eye tracking system, eye tracking in each of the at least one intermediate image based on one or more of the at least one part of the eye comprised in the at least one first ROI depicted in each of the at least one intermediate image, respectively.

According to a second aspect, the objects are achieved by an eye tracking system configured to control the exposure settings of an image sensor device.

The system comprises an image sensor device in the form of a rolling shutter image sensor device with global reset comprising an image sensor of i*j pixels, the image sensor device being configured to perform partial readouts; and processing circuitry. The eye tracking system is configured to obtain a first image comprising i*j pixels captured using the image sensor device at a current exposure setting, wherein the current exposure setting comprises a partial readout parameter, PR, having a value that correspond to a number, N, of image parts, $I_{PART(1 \ldots N)}$, for partial readout by the image sensor device, the number of image parts, N, being an integer ≥1. The processing circuitry is configured to determine an intensity value, $I_1$, of the first image and compare the intensity value, $I_1$, of the first image to a preset desired intensity value $I_{des}$. If the intensity value, $I_1$, of the first image differs more than a preset allowed deviation, d, from the preset desired intensity value, $I_{des}$ the processing circuitry is configured to determine an updated number, $N_{updated}$, of image parts for partial readout by the image sensor device based on the current number of image parts and the intensity value, $I_1$, of the first image, the updated number of image parts, $N_{updated}$ being an integer ≥1 and update the current exposure setting by setting the value of the partial readout parameter, PR, to the updated number, $N_{updated}$, of image parts.

The eye tracking system may further be configured to repeat the above actions until the intensity value, $I_1$, of the first image is within the preset allowed deviation, d, from the preset desired intensity value, $I_{des}$.

The image sensor device may further be configured to read out a number of image parts, $I_{PART(1 \ldots N)}$, one at a time, wherein the number of image parts corresponds to the value of the partial readout parameter, PR and the processing circuitry may further be configured to generate a second image by combining the read out image parts, $I_{PART(1 \ldots N)}$, into a combined image of i*j pixels.

The processing circuitry may be configured to determine the updated number, $N_{updated}$, of image parts for partial readout by the image sensor device based on the current number of image parts and the intensity value, $I_1$, of the first image by obtaining a factor α, the factor α being a numeric value. If $I_{des}>I_1$, the processing circuitry is then configured to setting the updated number, $N_{updated}$, of image parts to $N_{updated}$=round(N*α). If $I_{des}<I_1$, the processing circuitry is instead configured to setting the updated number, $N_{updated}$, of image parts to: $N_{updated}$=round(N/α).

In other embodiments, the processing circuitry may be configured to determine the updated number, $N_{updated}$, of image parts for partial readout by the image sensor device based on the current number of image parts and the intensity value, $I_1$, of the first image by determining a factor $\alpha=I_{des}/I_1$ and setting the updated number, $N_{updated}$, of image parts to: $N_{updated}$=round(N*α).

The processing circuitry may be configured to obtain the factor α by receiving input indicative of the factor α via a user input device.

The eye tracking system may further comprise or be communicatively connected to a memory, wherein the processing circuitry is configured to obtain the factor α by receiving or retrieving a preset factor α from the memory.

The processing circuitry may be configured to set the intensity value, $I_1$, of the first image to the $X^{th}$ percentile of a histogram of the intensities of the first image, X being a preset percentage between 0% and 100%. In some of these embodiments, X is 98% and the processing circuitry is configured to set the intensity value, $I_1$, of the first image to the value of the $98^{th}$ percentile of the histogram. In other of these embodiments, X is 50% and the processing circuitry is configured to set the intensity value, $I_1$, of the first image to the value of the $50^{th}$ percentile of the histogram. In yet other of these embodiments, X is 0% and the processing circuitry is configured to set the intensity value, $I_1$, of the first image to the value of the $0^{th}$ percentile of the histogram. In still other of these embodiments, X is 100% and the processing circuitry is configured to set the intensity value, $I_1$, of the first image to the value of the $100^{th}$ percentile of the histogram.

In some embodiments, the processing circuitry may be configured to set the intensity value, $I_1$, of the first image to the mean value of the intensities of the first image.

In some embodiments, the eye tracking system is configured to perform eye detection in the first image.

The eye tracking system may configured to perform the eye detection in the first image by the processing circuitry being configured to determine at least one first region of interest, ROI, in the first image, wherein each of the at least one first ROI comprises a group of pixels in the first image representing at least one part of an eye, wherein the at least one part of an eye comprises at least one glint, at least one pupil, a part of at least one iris, a part of at least one sclera, and/or a part of at least one eye lid. The processing circuitry may in these embodiments further be configured to obtain at least one intermediate image after obtaining the first image but before obtaining the second image, wherein the intermediate image comprises the at least one first ROI; and wherein the eye tracking system is further configured to perform eye tracking in each of the at least one intermediate image based on one or more of the at least one part of the eye comprised in the at least one first ROI depicted in each of the at least one intermediate image, respectively.

In some embodiments, the eye tracking system may be configured to perform eye detection in the second image.

The eye tracking system may be configured to perform the eye detection in the second image by the processing circuitry being configured to determine at least one second region of interest, ROI, in the second image, wherein each of the at least one second ROI comprises a group of pixels in the second image representing at least one part of an eye, wherein the at least one part of an eye comprises at least one glint, at least one pupil, a part of at least one iris, a part of at least one sclera, and/or a part of at least one eye lid. The processing circuitry may in these embodiments further be configured to obtain at least one subsequent image after obtaining the second image, wherein the subsequent image comprises the at least one second ROI; and wherein the eye tracking system is further configured to perform eye tracking in each of the at least one subsequent image based on one or more of the at least one part of the eye comprised in the at least one second ROI depicted in each of the at least one subsequent image, respectively.

The eye tracking system may be configured to perform eye detection both in the first image and in the second image according to any embodiments disclosed herein.

According to a third aspect, the objects are achieved by a non-transitory computer-readable storage medium storing instructions which, when executed by processing circuitry of a system, cause the system to perform the method steps of any of the appended method claims.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which:

FIG. 1 is a front view of an eye;

FIG. 2 shows a schematic overview of an eye tracking system, according to one or more embodiments;

FIG. 3 shows a schematic overview of an eye tracking system, according to one or more embodiments;

FIGS. 9 and 10 show examples of division of a first image into image parts for partial readout and combination into a second image;

FIG. 11 shows an example of a first image or a second image;

FIGS. 12A to D show non-limiting examples of intermediate images or subsequent images.

Figure 4:
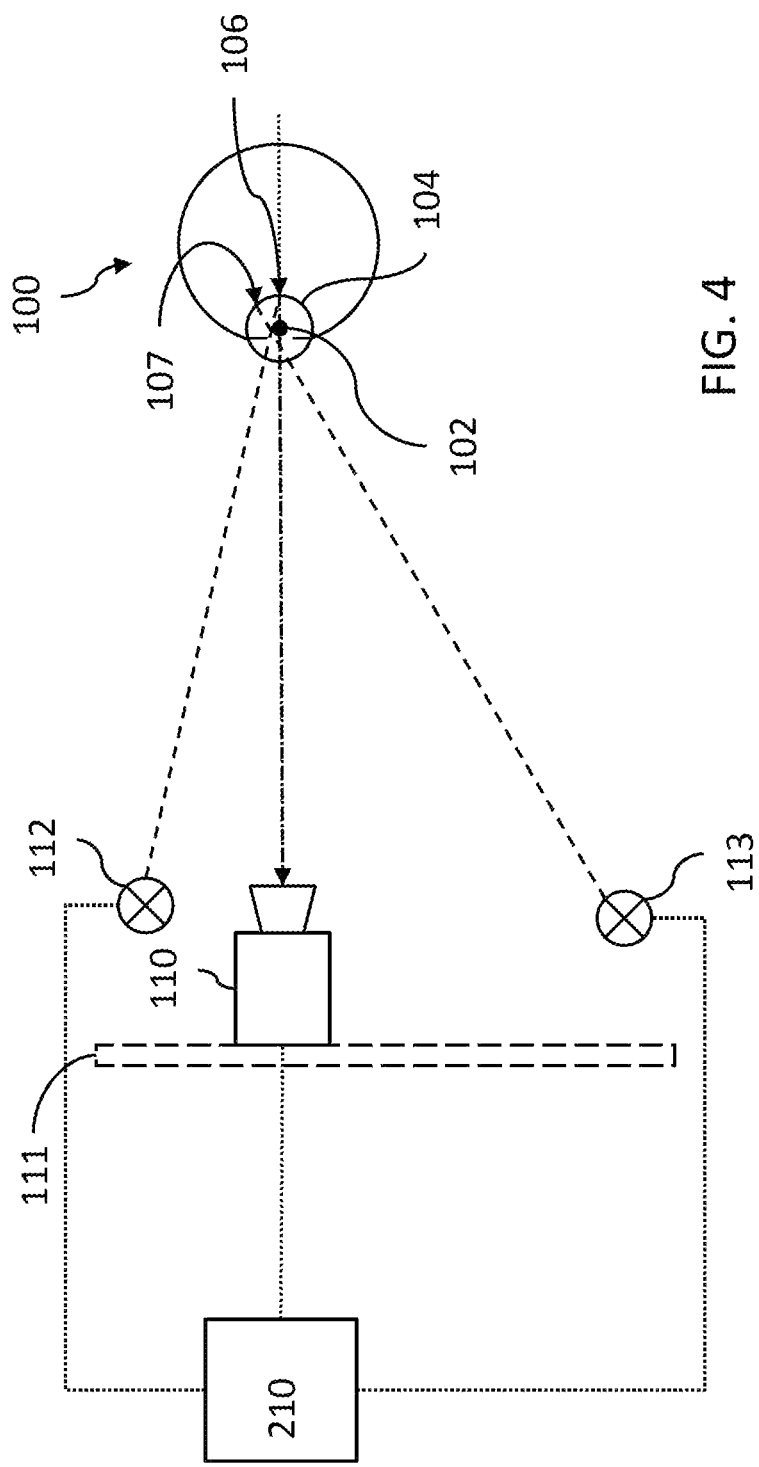
FIG. 4 shows a schematic overview of an eye of a user and components of an eye tracking system, according to one or more embodiments.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Embodiments of the present disclosure aim at solving, or at least ameliorating, the ensuing problem of how control to a digital image sensor device, comprising a plurality of pixels, such that the image read from the image sensor device is dynamically adapted to the ambient light.

Some embodiments of the present disclosure further aim at solving, or at least ameliorating, the ensuing problem of how to control an eye tracking system to achieve reliable eye detection in images captured by an image sensor device associated with the eye tracking system, by controlling the readout from the digital image sensor.

Solutions to the problems are provided by the embodiments described herein, in the description and the appended claims.

Advantageously, embodiments presented herein optimize the exposure settings of an image sensor device with regards to the light conditions in which the eye tracking system operates.

Some embodiments herein further specifically optimize the exposure settings for improved eye detection capabilities in subsequent images captured using the updated exposure setting, making the eye detection more reliable irrespective of the ambient light conditions. Thereby, embodiments presented herein further optimize the eye tracking performance of the eye tracking system with regards to the light conditions in which the eye tracking system operates, making the eye tracking or gaze tracking performance more reliable irrespective of the ambient light conditions.

One or more embodiments described herein comprises continuously controlling the eye tracking system by repeatedly updating the exposure settings of the image sensor device(s) of the eye tracking system, thereby continuously optimizing the exposure settings of the image sensor device and, for some embodiments, for eye detection with regards to the light conditions in which the eye tracking system operates. Thereby, embodiment herein contribute to continuously making eye detection performed using the disclosed eye detection system more reliable irrespective of the ambient light conditions. Consequently, the eye tracking performance of the eye tracking system is continuously optimized to the light conditions in which the eye tracking system currently operates, making the eye tracking or gaze tracking performance more reliable irrespective of the ambient light conditions.

A further advantage that follows from the above is that the visual result and user experience for a user of the eye tracking system is improved when the eye tracking or gaze tracking result becomes more reliable.

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The term eye tracking as used herein may be understood as comprising any of: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to any of the user's eyes, and may also be performed for both the eyes of a user in parallel, or consecutively.

Throughout the present disclosure, the term obtaining information may be understood as receiving information, in a push fashion, and/or retrieving information, in a pull fashion. As a specific example, obtaining an image may in the context of this description be understood as: capturing an image, using for example an image sensor device 110; receiving an image, for example from an imaging device, which may be the image sensor device 110, or from a memory; or retrieving an image, for example from an imaging device, which may be the image sensor device 110, or from a memory.

Methods, systems and associated storage media for controlling an eye tracking system will be described below with reference to FIGS. 1-13. First, an illustrative example of an eye will be described with reference to FIGS. 1 and 4.

FIG. 1 is a front view of an eye 100. FIG. 4 comprises a cross sectional view of the eye 100 from the side of the eye 100. While FIG. 4 shows more or less the entire eye 100, the front view presented in FIG. 1 only shows those parts of the eye 100 which are typically visible from in front of a person's face. As shown in FIG. 1, the eye 100 has a sclera 103 and a cornea 104 through which an iris 101 and a pupil 102 are visible in the front view. In FIG. 1, a glint 105 is shown, caused by a reflection 106, 107 of light emitted by an illuminator 112, 113 and reflected from the cornea 104 of the eye 100, as schematically illustrated in FIG. 4. The eye 100 further comprises an eye lid 108. The light emitted by the illuminator 112, 113 towards the eye 100 is in one or more embodiments light in the infrared frequency band, or in the near infrared frequency (NIR) band.

System Architecture

System embodiments will now be described with reference to FIGS. 2, 3 and 4.

FIGS. 2 and 3 are schematic overviews of an eye tracking system 200 comprising eye tracking equipment 220, and processing circuitry 210, according to one or more embodiments. FIG. 4 shows a schematic overview of an eye 100 of a user and components of an eye tracking system 200 comprising eye tracking equipment 220, and processing circuitry 210.

Turning first to FIGS. 2 and 3, there is schematically shown an eye tracking system 200 configured to control the exposure settings of the image sensor device 110 according to embodiments herein. The system 200 comprises an image sensor device 110 in the form of a rolling shutter image sensor device with global reset comprising an image sensor of pixels and processing circuitry 210.

That the image sensor device is a rolling shutter image sensor device with global reset means that the sensor is exposed to ambient light during the readout of the image. This may cause the image may be overexposed, whereby reduction of exposure time will improve the image quality of captured images. Embodiments herein achieve such reduction of exposure time (or increase in exposure time if the problem is underexposure) by using partial readout according to embodiments presented herein.

The image sensor device 110 is configured to perform partial readouts. The image parts for partial readout by the image sensor device 110 may each comprise the same number of pixels and have the same shape. Alternatively, the image parts for partial readout by the image sensor device may not comprise the same number of pixels or have the same shape. Therefore, in some embodiments, the image sensor device 110 may be configured to read out image parts which all comprise the same number of pixels and have the same shape and in other embodiments the image sensor device 110 may be configured to read out image parts that do not all comprise the same number of pixels or have the same shape.

In some embodiments, the image sensor device 110 may be sensitive to infrared, IR, light. In one or more embodiments, the image sensor device 110 may further, or alternatively, be sensitive to visible light radiation.

The eye tracking system 200 is configured to obtain a first image 500 comprising pixels captured using the image sensor device 110 at a current exposure setting, wherein the current exposure setting comprises a partial readout parameter PR having a value that correspond to a number, N, of image parts $I_{PART(1 \ldots N)}$ for partial readout by the image sensor device 110, the number of image parts, N, being an integer ≥1. The processing circuitry 210 is thereafter configured to determine an intensity value $I_1$ of the first image 500 and compare the intensity value $I_1$ of the first image 500 to a preset desired intensity value $I_{des}$. If the intensity value $I_1$ of the first image 500 differs more than a preset allowed deviation d from the preset desired intensity value $I_{des}$, the processing circuitry 210 is configured to determine, by the processing circuitry 210, an updated number, $N_{updated}$, of image parts for partial readout by the image sensor device 110 based on the current number of image parts and the intensity value $I_1$ of the first image 500, the updated number of image parts, $N_{updated}$ being an integer ≥1. The processing circuitry 210 is thereafter configured to update, by the processing circuitry 210, the current exposure setting by setting the value of the partial readout parameter PR to the updated number, $N_{updated}$, of image parts. The eye tracking system 200 may be configured to repeat the above until the intensity value $I_1$ of the first image 500 is within the preset allowed deviation d from the preset desired intensity value $I_{des}$.

In some embodiments, the processing circuitry 210 may be configured to determine the intensity value $I_1$ of the first image 500 by setting it to the $X^{th}$ percentile of a histogram of the intensities of the first image 500, X being a preset percentage between 0% and 100%. For example, X may be 100% whereby the processing circuitry 210 is configured to set the intensity value $I_1$ of the first image 500 to the value of the 100$^{th}$ percentile of the histogram. If no histogram is employed, the processing circuitry may in this case be configured to set the $I_1$ of the first image 500 to the maximum intensity value among the intensity values of the pixels in the first image 500 in any other suitable manner. In a further example, X may be 98% whereby the processing circuitry 210 is configured to set the intensity value to the value of the 98$^{th}$ percentile of the histogram. In yet another example, X may be 50% whereby the processing circuitry 210 is configured to set the intensity value to the value of the 50$^{th}$ percentile of the histogram. If no histogram is employed, the processing circuitry may in this case be configured to set the $I_1$ of the first image 500 to the median intensity value among the intensity values of the pixels in the first image 500 in any other suitable manner. In yet a further example, X may be 0% whereby the processing circuitry 210 is configured to set the intensity value to the value of the 0$^{th}$ percentile of the histogram. If no histogram is employed, the processing circuitry may in this case be configured to set the $I_1$ of the first image 500 to the minimum intensity value among the intensity values of the pixels in the first image 500 in any other suitable manner.

In another embodiment, the processing circuitry 210 may be configured to set the intensity value $I_1$ of the first image 500 to the mean value of the intensities of the pixels in the first image 500.

The image sensor device 110 may be configured to read out a number of image parts $I_{PART(1 \ldots N)}$ one at a time, wherein the number of image parts corresponds to the value of the partial readout parameter PR. The processing circuitry 210 may then be configured to generate a second image 600 by combining the read out image parts $I_{PART(1 \ldots N)}$ into a combined image of pixels. Two non-limiting illustrative examples are shown in FIGS. 9 and 10.

In one or more embodiment, the processing circuitry 210 may be configured to determine the updated number, $N_{updated}$, of image parts for partial readout by the image sensor device 110 based on the current number of image parts and the intensity value $I_1$ of the first image 500 by obtaining a factor $\alpha$, the factor $\alpha$ being a numeric value. If $I_{des} > I_1$, the processing circuitry 210 is then configured to set the updated number, $N_{updated}$, of image parts to: $N_{updated}$=round(N*$\alpha$). If $I_{des} < I_1$, the processing circuitry 210 is instead configured to set the updated number, $N_{updated}$, of image parts to: $N_{updated}$=round(N/$\alpha$).

In one or more other embodiments, the processing circuitry 210 may be configured to determine the updated number, $N_{updated}$, of image parts for partial readout by the image sensor device 110 based on the current number of image parts and the intensity value, $I_1$, of the first image (500) by determining a factor $\alpha = I_{des}/I_1$ and setting the updated number, $N_{updated}$, of image parts to: $N_{updated}$=round(N*$\alpha$).

Rounding to an integer may, in any of the embodiments under step 540, comprise rounding up to the closest integer, rounding down to the closest integer, or rounding up or down to the integer that is closest of the two. The rounding method may be preset in the system settings or be set in response to input from a user interacting with an input device connected to the system 200.

The processing circuitry 210 may be configured to obtain the factor $\alpha$ by receiving input indicative of the factor $\alpha$ via a user input device (not shown in the figures) connected to the system 200.

The eye tracking system 200 may further comprise or be communicatively connected to a memory 230, wherein the processing circuitry 210 may be configured to obtain the factor $\alpha$ by receiving or retrieving a preset factor $\alpha$ from the memory 230.

The preset desired intensity value $I_{des}$ may be set during manufacturing or calibration of the eye tracking system 200. Alternatively, the eye tracking system 200 may be configured to set the preset desired intensity value $I_{des}$ during use of the eye tracking system 200. In different embodiments, the eye tracking system 200 may then be configured to retrieve the preset desired intensity value $I_{des}$, e.g. the memory 230, or to receive user input indicative of the preset desired intensity value $I_{des}$ via a user input device connected to the eye tracking system 200. The method described in connection with FIG. 5 below may correspondingly comprise, before or in step 530, receiving or retrieving the preset desired intensity value $I_{des}$ from memory or via a user input device.

The eye tracking system 200 may be configured to perform eye detection and eye tracking or gaze tracking. The image sensor device 110 may to this end be configured to capture images of one or both eyes of a user of the eye tracking system 200 based on which eye tracking may be performed.

In some embodiments, the eye tracking system 200 may be configured to perform eye detection in the first image 500. In these embodiments, the processing circuitry 210 may be configured to determine at least one first region of interest, ROI, in the first image 500, wherein each of the at least one first ROI comprises a group of pixels in the first image 500 representing at least one part of an eye, wherein the at least one part of an eye comprises at least one glint, at least one pupil, a part of at least one iris, a part of at least one sclera, and/or a part of at least one eye lid. The processing circuitry may further be configured to obtain at least one intermediate image 550 after obtaining the first image 500 but before obtaining the second image 600, wherein the intermediate image 550 comprises the at least one first ROI; and wherein the eye tracking system 200 is further configured to perform eye tracking in each of the at least one intermediate image 550 based on one or more of the at least one part of the eye comprised in the at least one first ROI depicted in each of the at least one intermediate image 550, respectively.

In some embodiments, the eye tracking system 200 may be configured to perform eye detection in the second image 600.

The eye tracking system 200 may be configured to perform the eye detection in the second image 600 by the processing circuitry 210 being configured to determine at least one second region of interest, ROI, in the second image 600, wherein each of the at least one second ROI comprises a group of pixels in the second image 600 representing at least one part of an eye, wherein the at least one part of an eye comprises at least one glint, at least one pupil, a part of at least one iris, a part of at least one sclera, and/or a part of at least one eye lid. The processing circuitry 210 may further be configured to obtain at least one subsequent image after obtaining the second image 600, wherein the subsequent image comprises the at least one second ROI; and wherein the eye tracking system 200 is further configured to perform eye tracking in each of the at least one subsequent image 650 based on one or more of the at least one part of the eye comprised in the at least one second ROI depicted in each of the at least one subsequent image 650, respectively.

In some embodiments, the eye tracking system 200 may be configured to perform eye detection in any combination of one or more first image 500, of one or more intermediate image 550, of one or more second image 600 and of one or more subsequent image 650.

According to some embodiments, the eye tracking system 200 may comprise at least one illuminator for illuminating the eyes. The eye tracking system 200 (which may also be referred to as a gaze tracking system), according to an embodiment comprises, or is connected to or associated with, one or more illuminator 112 and/or one or more illuminator 113, for illuminating the eyes of a user.

The illuminator 112 and the illuminator 113 may each be light emitting diodes emitting light in the infrared frequency band, or in the near infrared frequency (NIR) band, i.e. a near infrared (NIR) diode. The terms illuminator and diode may be understood as comprising a single illuminator or diode, or alternatively as comprising a group of two or more illuminators or diodes that are arranged very closely together and controlled to act as a single light source, i.e. which are controlled to operate such that they together cause a single glint when illuminated.

Figure 5:
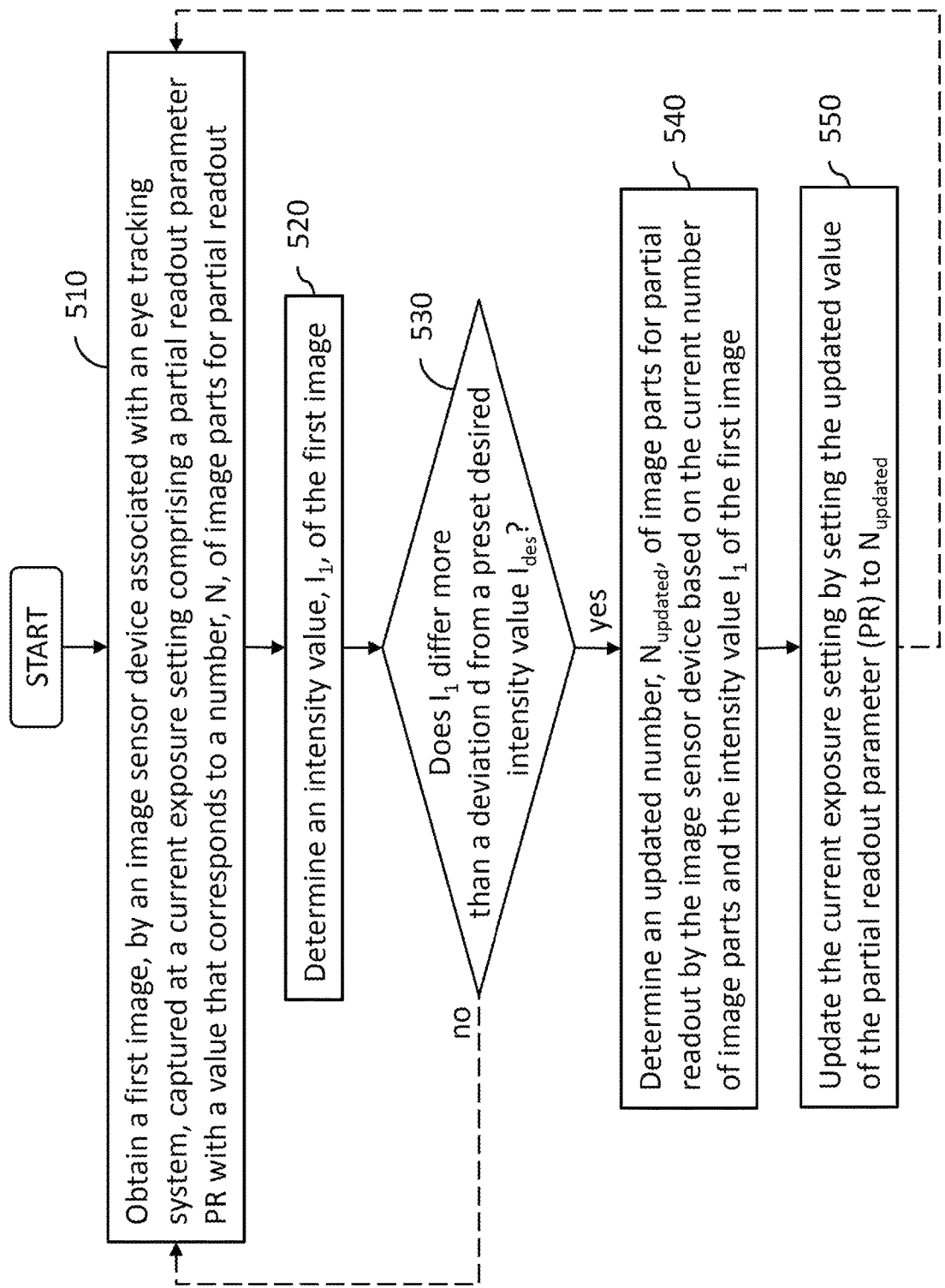
FIG. 5 is a flow chart of a method according to one or more embodiments.

Preferably, the illuminator 112 is a bright pupil (BP) diode arranged coaxially with (or close to) the camera 110, or other imaging sensor 110, so that the camera 110 may capture bright pupil images of the user's eyes, if the illuminator 112 emits light at, or close to, its maximum power. In this case, due to the coaxial arrangement of the illuminator 112 and the camera, or other imaging sensor, 110, light reflected from the retina of an eye 100, at point 106, returns back out through the pupil 102 towards the camera 110, so that the pupil 102 appears brighter than the iris 101 surrounding it in images where the illuminator 112 illuminates the eye. Thereby, the eye tracking system 200 is configured to obtain BP images of the user's eye 100. In FIG. 5, a non-limiting example of a BP image is shown, wherein each pupil 102 is caused by the in-falling and reflected light from the illuminator 112 to appear brighter than their respective surrounding iris in the captured image 500.

The optional one or more second illuminator 113 may be arranged non-coaxially with (or further away from) the camera 110 for capturing dark pupil (DP) images (not shown in the figures). Due to the non-coaxial arrangement of the one or more second illuminator 113 and the camera 110, light reflected from the retina of an eye 100, at point 107, does not reach the camera 110 and the pupil appears darker than the iris surrounding it in images where a second illuminator 113 illuminates the eye.

The image sensor device 110 may for example be a camera, such as a complementary metal oxide semiconductor (CMOS) camera or a charged coupled device (CCD) camera. Hereinafter, the image sensor device 110 may be referred to as a camera 110.

FIG. 4 also shows, for purpose of understanding, a screen 111 towards which the user eye 100 is gazing. The display 111 may for example be a liquid-crystal display (LCD) or a LED display. However, other types of displays may also be envisaged. The display may for example be flat or curved. The display 111 may for example be placed in front of one of the user's eyes.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 230. Such a memory 230 may for example be comprised in the system 200 or may be external to (for example located remotely from) the system 200. The memory 230 may store instructions for causing the system 200 to perform a method according to any of the embodiments presented in connection with FIG. 2.

The processing circuitry 210 may in one or more embodiment be configured to perform any or all of the method embodiments described in connection with FIGS. 5, 6, 7, 8A and/or 8B.

It will be appreciated that the system 200 embodiments described above with reference to FIGS. 2, 3 and 4 are provided as examples, and that many other systems may be envisaged. For example, the system 200 may consist only of the processing circuitry 210.

Method Embodiments

In the following, method embodiments will be described in connection with FIGS. 5, 6, 7, 8A and 8B, with reference to FIGS. 9, 10, 11, 12A to D and 13.

Turning now to FIG. 5, there is shown a flow chart presenting embodiments of a computer implemented method for controlling the exposure settings of an image sensor device 110 associated with an eye tracking system 200, the image sensor device 110 being a rolling shutter image sensor device with global reset comprising an image sensor of pixels, the method comprising:

In step 510: obtaining, in the eye tracking system 200, a first image 500 comprising i*j pixels captured using the image sensor device 110 at a current exposure setting, wherein the current exposure setting comprises a partial readout parameter PR having a value that corresponds to a number, N, of image parts $I_{PART(1\ldots N)}$ for partial readout by the image sensor device 110, the number of image parts, N, being an integer ≥1.

In step 520: determining, by processing circuitry 210 in the eye tracking system 200, an intensity value $I_1$ of the first image 500.

An intensity value may in the context of the present disclosure also be referred to as a brightness level or an exposure value.

In one or more embodiments, determining the intensity value $I_1$ of the first image 500 may comprise setting, by the processing circuitry 210, the intensity value $I_1$ of the first image 500 to the $X^{th}$ percentile of a histogram of the intensities of the first image 500, X being a preset percentage between 0% and 100%.

In some of these embodiments, X is 100%, whereby the intensity value $I_1$ of the first image 500 is set to the value of the $100^{th}$ percentile of the histogram. If no histogram is employed, this corresponds to setting the intensity value $I_1$ of the first image 500 to the maximum value of the pixel intensities in the first image 500. Setting the intensity value $I_1$ of the first image 500 to the value of the $100^{th}$ percentile of the histogram at this point is advantageous because it removes, or at least greatly reduces (in the case of defect pixels which are 100% saturated) the risk of saturated pixels occurring in images captured after the updating of exposure settings in step 550.

In some of these embodiments, X may be 98%, whereby the intensity value $I_1$ of the first image 500 is set to the value of the $98^{th}$ percentile of the histogram. In some embodiments this is a preferable alternative to using the maximum pixel value, since some of the pixels in the first image 500 may be saturated and thereby not contributing accurate information on the overall image exposure level. Setting the intensity value $I_1$ of the first image 500 to the value of the $98^{th}$ percentile of the histogram at this point is advantageous because it almost completely removes, or at least greatly reduces, the risk of saturated pixels occurring in images captured after the updating of exposure settings in step 550. Furthermore, defect pixels (i.e. pixels which are always 100% saturated) will have less impact on the updating of the exposure settings compared to if the intensity value $I_1$ of the first image 500 is set to $100^{th}$ percentile. If active illumination is used, then this also allows saturated reflections in eyeglasses while maintaining good general illumination.

In some of these embodiments, X is 50%, whereby the intensity value $I_1$ of the first image 500 is set to the value of the $50^{th}$ percentile of the histogram. If no histogram is employed, this corresponds to setting the intensity value $I_1$ of the first image 500 to the median value of the pixel intensities in the first image 500. Setting the intensity value $I_1$ of the first image 500 to the value of the $50^{th}$ percentile of the histogram at this point is advantageous because it greatly reduces the sensitivity to/impact of outliers (e.g. pixels that have very high or low intensities) on the updating of the exposure settings.

In some of these embodiments, X is 0%, whereby the intensity value $I_1$ of the first image 500 is set to the value of the $0^{th}$ percentile of the histogram. If no histogram is employed, this corresponds to setting the intensity value $I_1$ of the first image 500 to the minimum value of the pixel intensities in the first image 500. Setting the intensity value $I_1$ of the first image 500 to the value of the $0^{th}$ percentile of the histogram at this point is advantageous if it is desirable to take the darkest pixels/pixels of lowest intensity into consideration (i.e. the darkest pixel may be set to have a specific value) when updating the exposure settings.

In alternative embodiments, the intensity value $I_1$ of the first image 500 may be set to the mean value of the intensities of the first image (500).

In step 530: comparing, by the processing circuitry 210, the intensity value $I_1$ of the first image 500 to a preset desired intensity value $I_{des}$.

If the intensity value $I_1$ of the first image 500 differs more than a preset allowed deviation d from the preset desired intensity value $I_{des}$, the method continues in step 540.

In some embodiments, if $I_1 > (I_{des}+d)$, the first image 500 is considered to be over-exposed. In this case, exposure control of the image sensor device 110 to reduce the intensity value in subsequently captured images is needed.

In some embodiments, if $I_1 < (I_{des}-d)$, the first image 500 is considered to be under-exposed. In this case, exposure control of the image sensor device 110 to increase the intensity value in subsequently captured images is needed.

As illustrated in FIG. 5 by a dashed arrow, if the intensity value $I_1$ of the first image 500 does not differ more than a preset allowed deviation d from the preset desired intensity value $I_{des}$, i.e. if the exposure settings are satisfactory for the current lighting conditions, the method may return to step 510 to capture a new first image 500. The method may comprise, and the image sensor device 110 may be configured to, capturing images (one or more first image, second image, intermediate image and/or subsequent image) using the current, satisfactory, exposure settings until the next time the exposure settings are controlled and, if needed, updated according to embodiments presented herein.

In step 540: determining, by the processing circuitry 210, an updated number, $N_{updated}$, of image parts for partial readout by the image sensor device 110 based on the current number of image parts and the intensity value $I_1$ of the first image 500, the updated number of image parts, $N_{updated}$ being an integer ≥1.

Figure 7:
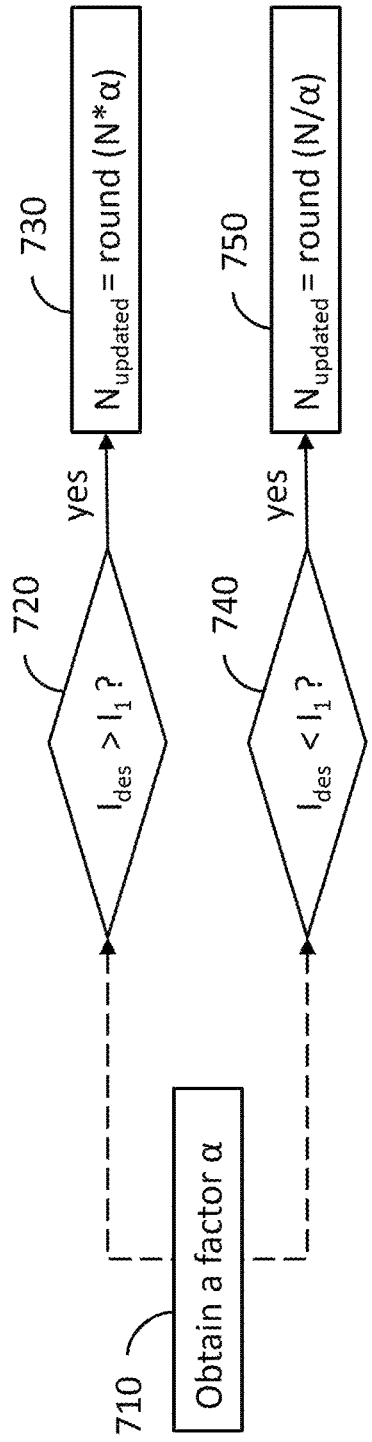
FIG. 7 is a flow chart of a method according to one or more embodiments.
Figure 8:
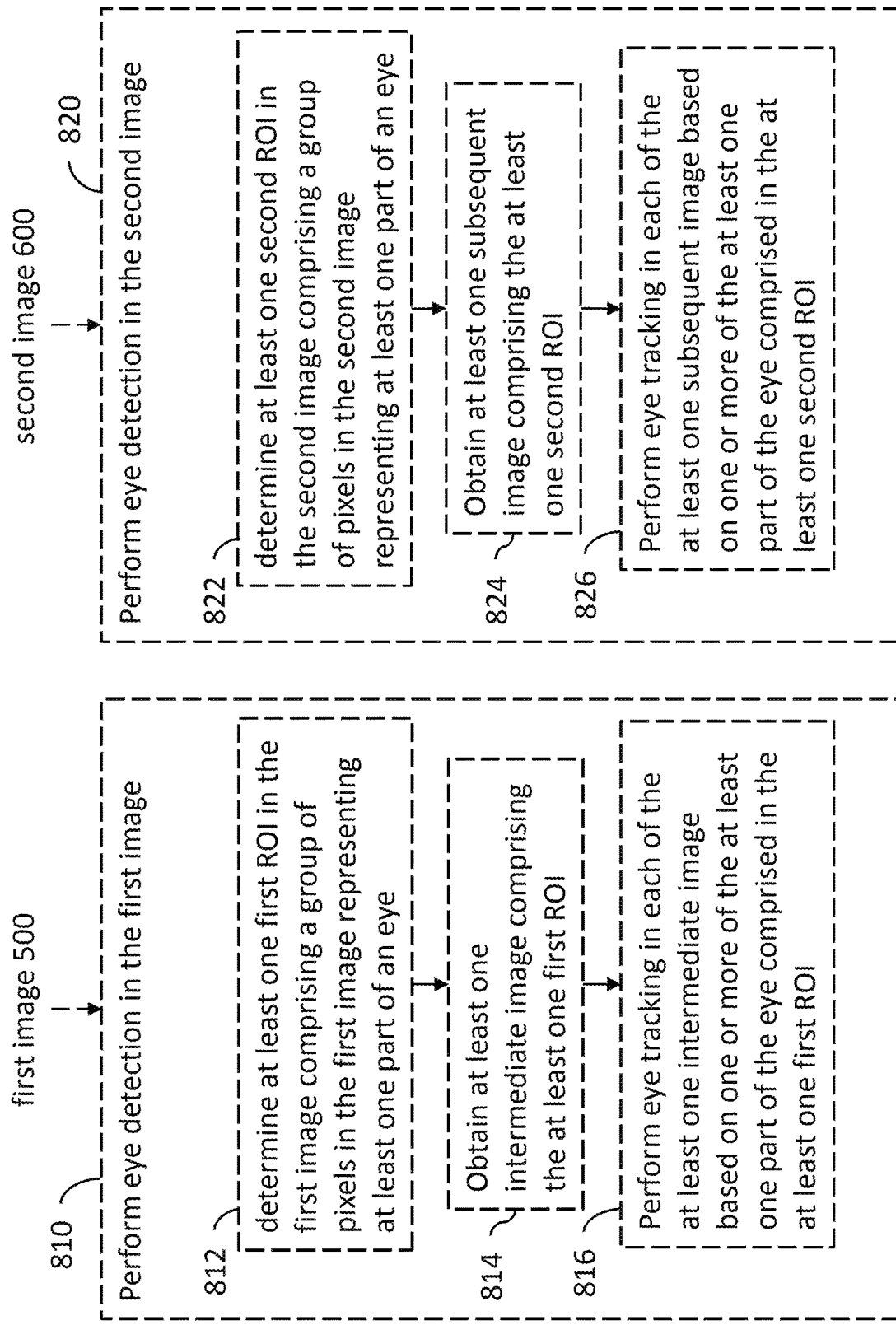
FIGS. 8A and 8B are flow charts of method embodiments.

In one or more embodiment of step 540, determining, by the processing circuitry 210, the updated number, $N_{updated}$, of image parts for partial readout by the image sensor device 110 based on the current number of image parts and the intensity value $I_1$ of the first image 500 may comprise a number of substeps, as illustrated in FIG. 7, comprising:

In sub-step 710: obtaining, by the processing circuitry 210, a factor $\alpha$.

The factor $\alpha$ is a numeric value representing a factor used to update the number of partial readouts.

In a preferred embodiment, $\alpha \geq 1$.

The factor $\alpha$ may be used in different ways for updating the number of partial readouts in different ways, two of which are shown in the sequence of sub-steps 720 and 730, and the sequence of sub-steps 740 and 750, respectively.

Either the sequence of sub-steps 720 and 730, or the sequence of sub-steps 740 and 750, or both may be performed for every obtained factor $\alpha$.

In sub-step 720: determining if $I_{des} > I_1$.

If it is determined that $I_{des} > I_1$, the method continues in sub-step 730.

In sub-step 730: setting, by the processing circuitry 210, the updated number, $N_{updated}$, of image parts to: $N_{updated}$=round($N*\alpha$).

In a non-limiting example a may be preset to 2, whereby the updated number, $N_{updated}$, of image parts partial readouts are in sup-step 720 increased with a factor 2 (and rounded to an integer if not both N and a are already integers):

$$N_{updated}=\text{round}(N*2).$$

In sub-step 740: determining if if $I_{des} < I_1$.

In sub-step 750: setting, by the processing circuitry (210), the updated number, $N_{updated}$, of image parts to: $N_{updated}$=round($N/\alpha$).

In the non-limiting example where a is preset to 2, the updated number, $N_{updated}$, of image parts partial readouts are in sup-step 720 decreased with a factor 2 (and rounded to an integer if not both N and a are already integers):

$$N_{updated}=\text{round}(N/2).$$

In one or more alternative embodiment of step 540 the determining, by the processing circuitry 210, the updated number, $N_{updated}$, of image parts for partial readout by the image sensor device 110 based on the current number of image parts and the intensity value $I_1$ of the first image 500 comprise: determining, by the processing circuitry 210, a factor $\alpha = I_{des}/I_1$; and setting, by the processing circuitry 210, the updated number, $N_{updated}$, of image parts to: $N_{updated}$=round($N*\alpha$).

Rounding to an integer may, in any of the embodiments under step 540, comprise rounding up to the closest integer, rounding down to the closest integer, or rounding up or down to the integer that is closest of the two. The rounding method may be preset in the system settings or be set in response to input from a user interacting with an input device connected to the system 200.

In any of the embodiments under step 540, obtaining the factor $\alpha$, by the processing circuitry 210, may comprise receiving or retrieving a preset factor $\alpha$ from a memory 230 comprised in or communicatively connected to the eye tracking system 200. Alternatively, obtaining the factor $\alpha$, by the processing circuitry 210, may comprise receiving input indicative of the factor $\alpha$ via a user input device.

In step 550: updating, by the processing circuitry 210, the current exposure setting by setting the value of the partial readout parameter PR to the updated number, $N_{updated}$, of image parts.

Thereby, the method optimizes the exposure settings of the image sensor device 110 to the light conditions in which the eye tracking system 200 currently operates.

After updating the current exposure setting in step 550, the method may return to step 510, repeating the method of FIG. 5 and thereby continuously optimizing the exposure settings of the image sensor device 110 to the light conditions in which the eye tracking system 200 currently operates. In some embodiments, the method comprises performing method steps 510 to 550 repeatedly until the intensity value $I_1$ of the first image 500 is within the preset allowed deviation d from the preset desired intensity value $I_{des}$.

Figure 6:
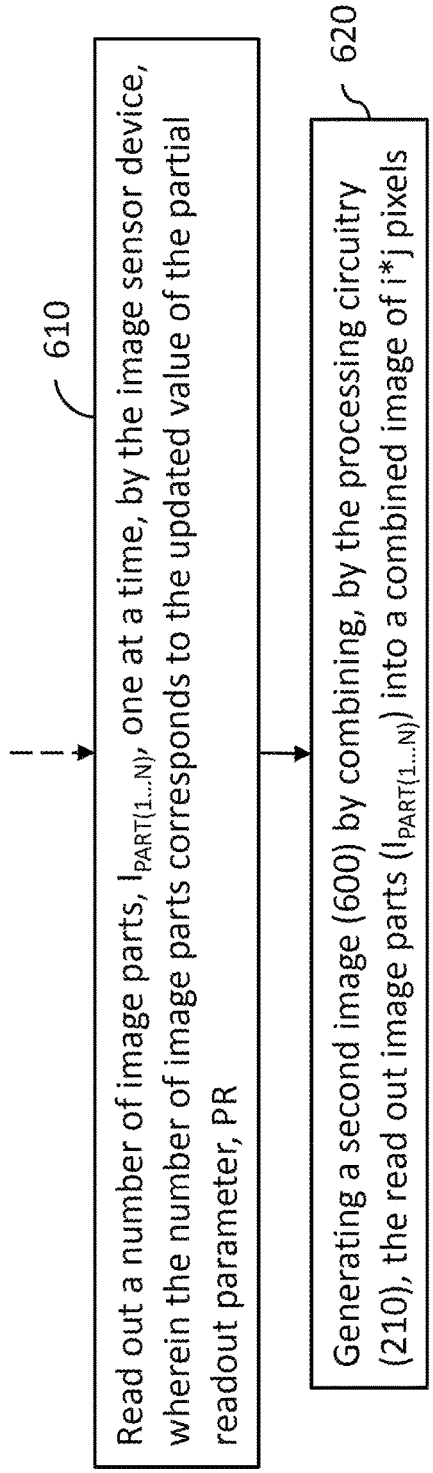
FIG. 6 is a flow chart of a method according to one or more embodiments.

As illustrated in FIG. 6, the method according to any of the embodiments described in connection with FIG. 5 may further comprise:

In step 610: reading out a number of image parts $I_{PART(1 \ldots N)}$ one at a time, by the image sensor device 110, wherein the number of image parts corresponds to the value of the partial readout parameter PR.

By performing a partial readout, the exposure time and hence exposure for each respective image part $I_{PART(1 \ldots N)}$ is reduced. Thereby, an overexposure of the partial readouts is avoided.

Turning now to FIGS. 9 and 10, two non-limiting examples of division into a number of image parts $I_{PART(1 \ldots N)}$ are shown. In FIG. 9 N=4 (or $N_{updated}$=4, depending on where we are in the method) and in FIG. 10 N=5 (or $N_{updated}$=5, depending on where we are in the method), but of course any suitable number of image parts may be selected.

In some embodiments, the image parts for partial readout by the image sensor device 110 each comprises the same number of pixels and have the same shape. This is for instance illustrated in the example of FIG. 9, by the image parts $I_{PART1}$, $I_{PART2}$, $I_{PART3}$, $I_{PART4}$.

In other embodiments, the image parts for partial readout by the image sensor device 110 do not comprise the same number of pixels or have the same shape. This is for instance illustrated in the example of FIG. 10, wherein the image parts $I_{PART1}$, $I_{PART2}$, $I_{PART3}$, $I_{PART4}$ have the same size and amount of pixels, but the image part $I_{PART5}$ differs from the others.

Of course, any suitable division into image parts may be used, including but not limited to division into rows, columns, set of rows, sets of columns, quarters, differentiated image parts etc.

In step 610: generating a second image 600 by combining, by the processing circuitry 210, the read out image parts $I_{PART(1 \ldots N)}$ into a combined image of pixels.

In the embodiments presented herein, none of the image parts $I_{PART(1 \ldots N)}$ overlap with any of the other image parts $I_{PART(1 \ldots N)}$. In other words, the image parts $I_{PART(1 \ldots N)}$ are non-overlapping. The image parts may be combined by being placed side-by-side, for example by using what is sometimes referred to as "stitching", or other known image combination methods wherein no overlapping is provided. As the combination of image parts does not involve techniques such as superimposition or fusion of the parts into a combined image, the combination of image parts into a combined image is computationally inexpensive and fast.

Turning again to FIGS. 9 and 10, there is illustrated how the N image parts $I_{PART(1 \ldots N)}$ may be combined into a second image 600, having the same number, pixels as the first image 500.

Eye Detection and Eye Tracking

As eye detection and eye tracking is highly dependent on the light conditions in which the eye tracking system 200 currently operates, the method embodiments presented in connection with FIGS. 5, 6 and 7 further optimize, and in the case of the iterative method continuously optimize, the exposure settings of the image sensor device 110 for eye detection and eye tracking performance of the eye tracking system 200.

The method may further comprise performing eye detection and possibly eye tracking using the eye tracking system 200. Some exemplary embodiments are described in connection with FIGS. 8A and 8B below, together with FIGS. 11, 12A-D and 13.

FIG. 11 show an example of a first image 500 or a second image 600 captured using the image sensor device 110 associated with the eye tracking system 200 depicting a face comprising two eyes 100, 120 and some non-limiting examples of different ROIs 501, 601, 502, 602, 503, 603, 504, 604, as described further below in connection with FIGS. 8A, 8B and 11.

Each of the at least one ROI 501, 502, 503, 504, 601, 602, 603, 604 respectively, may have any suitable size and shape, as long as it includes the at least a part of the depicted at least one eye 100, 120. In some embodiments, each of the at least one ROI, respectively, may be defined as an area (rectangular or otherwise suitably shaped) enclosing at least a part of a single eye 100, 120. Examples of such ROIs are illustrated in FIG. 11 as ROIs 502, 602 and 503, 603. Another non-limiting suitable shape is an ellipse, as illustrated by the ROI 504, 604. In other embodiments, wherein two eyes 100, 120 are depicted in the first image 500 or second image 600 a ROI may be defined as an area (rectangular or otherwise suitably shaped) enclosing at least part of both eyes 100 and 120. This is illustrated in FIG. 11 as ROI 501, 601.

FIGS. 12A to D show some non-limiting examples of intermediate images 550 or subsequent images 650, which are described further below.

Figure 13:
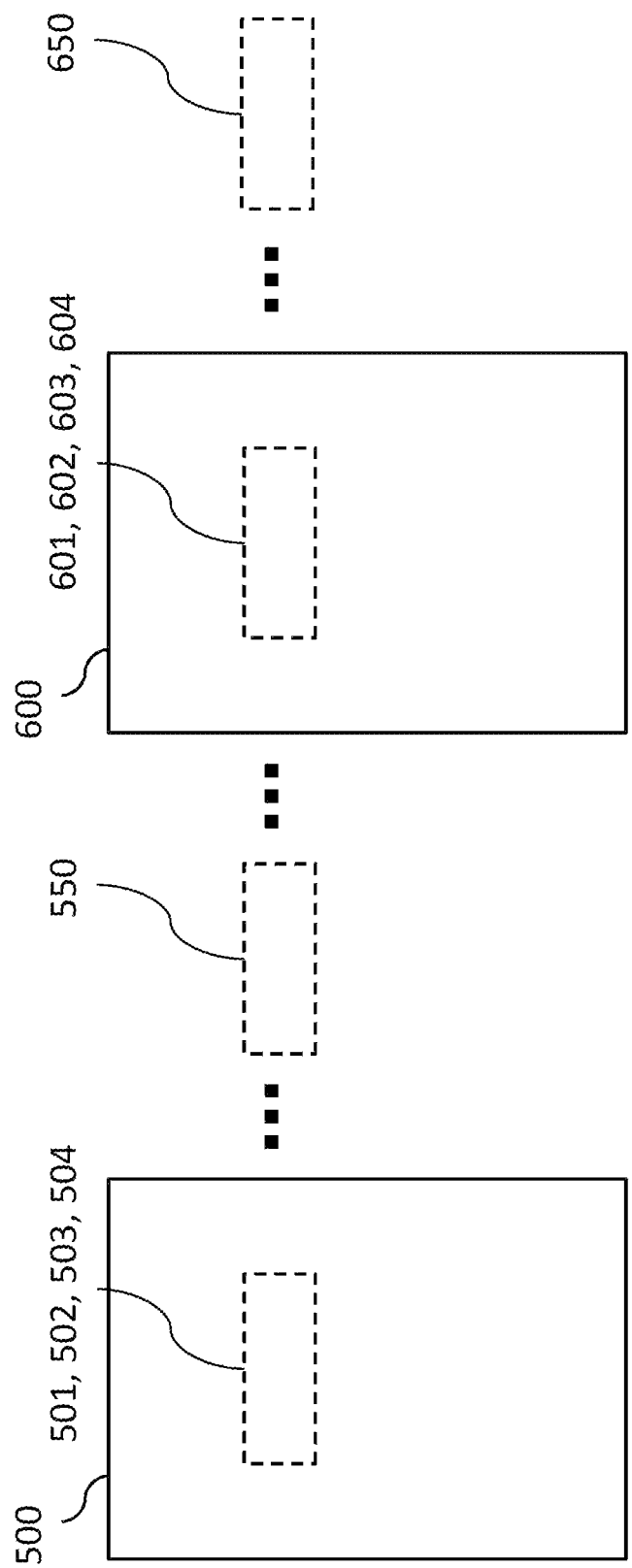
FIG. 13 shows a sequence of captured images.

FIG. 13 shows a sequence of captured images, comprising at least one first image 500, at least one second image 600, and optionally at least one intermediate image 550 and/or at least one subsequent image 650.

Turning now to FIGS. 8A and 8B, there are shown method embodiments, comprising performing eye detection and eye tracking based on the first or second image 500, 600, or on an intermediate image 550 or a subsequent image 650, respectively. Of course, the methods of FIGS. 8A and 8B may be combined. In other words, eye detection and/or eye tracking may be performed on the basis of one or more first image 500, one or more second image 600, one or more intermediate image 550 and/or one or more subsequent image 650, if suitable.

The method of FIG. 8A comprises:

In step 810: performing, by the eye tracking system 200, eye detection in the first image 500.

The eye tracking system 200 may correspondingly be configured to perform eye detection in the first image 500.

Thereby, where applicable, the location of the eye/eyes of the depicted user is/are located at an early stage (i.e. already in the first image 500 as compared to performing eye detection in a later captured image) and can be further processed by the eye tracking system 200.

In one or more embodiments of the method of FIG. 8A, as further illustrated in FIGS. 11, 12A-D and 13, step 810 comprises the sub-steps 812 to 816, comprising:

In sub-step 812: determining, by the processing circuitry 210, at least one first region of interest, ROI, 501, 502, 503, 504 in the first image 500, wherein each of the at least one first ROI 501, 502, 503, 504 comprises a group of pixels in the first image 500 representing at least one part of an eye, wherein the at least one part of an eye comprises at least one glint, at least one pupil, a part of at least one iris, a part of at least one sclera, and/or a part of at least one eye lid.

The processing circuitry 210 may correspondingly be configured to determine at least one first region of interest, ROI, 501, 502, 503, 504 in the first image 500, wherein each of the at least one first ROI 501, 502, 503, 504 comprises a group of pixels in the first image 500 representing at least one part of an eye, wherein the at least one part of an eye comprises at least one glint, at least one pupil, a part of at least one iris, a part of at least one sclera, and/or a part of at least one eye lid.

In sub-step 814: obtaining, by the processing circuitry 210, at least one intermediate image 550 after obtaining the first image 500 but before obtaining the second image 600, wherein the intermediate image 550 comprises the at least one first ROI 501, 502, 503, 504.

The processing circuitry 210 may correspondingly be configured to obtain at least one intermediate image 550 after obtaining the first image 500 but before obtaining the second image 600, wherein the intermediate image 550 comprises the at least one first ROI 501, 502, 503, 504.

In sub-step 816: performing, by the eye tracking system 200, eye tracking in each of the at least one intermediate image 550 based on one or more of the at least one part of the eye comprised in the at least one first ROI depicted in each of the at least one intermediate image 550, respectively.

The eye tracking system 200 may correspondingly be configured to perform eye tracking in each of the at least one intermediate image 550 based on one or more of the at least one part of the eye comprised in the at least one first ROI depicted in each of the at least one intermediate image 550, respectively.

The method of FIG. 8B comprises:

In step 820: performing, by the eye tracking system 200, eye detection in the second image 600.

The eye tracking system 200 may correspondingly be configured to perform eye detection in the second image 600.

Thereby, where applicable, the location of the eye/eyes of the depicted user is/are located and can be further processed by the eye tracking system 200. As the second image 600 is captured after updating of the exposure settings, the exposure and eye detection conditions of the second image 600 are improved compared to for example the first image 500 and the result of the eye detection performed in the second image 600 is hence more reliable.

In one or more embodiments of the method of FIG. 8B, as further illustrated in FIGS. 11, 12A-D and 13, step 820 comprises the sub-steps 822 to 826, comprising:

In sub-step 822: determining, by the eye tracking system 200, at least one second region of interest, ROI, 601, 602, 603, 604 in the second image 600, wherein each of the at least one second ROI 601, 602, 603, 604 comprises a group of pixels in the second image 600 representing at least one part of an eye, wherein the at least one part of an eye comprises at least one glint, at least one pupil, a part of at least one iris, a part of at least one sclera, and/or a part of at least one eye lid.

The processing circuitry 210 may correspondingly be configured to determine at least one second region of interest, ROI, 601, 602, 603, 604 in the second image 600, wherein each of the at least one second ROI 601, 602, 603, 604 comprises a group of pixels in the second image 600 representing at least one part of an eye, wherein the at least one part of an eye comprises at least one glint, at least one pupil, a part of at least one iris, a part of at least one sclera, and/or a part of at least one eye lid.

In sub-step 824: obtaining, by the processing circuitry 210, at least one subsequent image 650 after obtaining the second image 600, wherein the subsequent image comprises the at least one second ROI 601, 602, 603, 604.

The processing circuitry 210 may correspondingly be configured to obtain at least one subsequent image 650 after obtaining the second image 600, wherein the subsequent image comprises the at least one second ROI 601, 602, 603, 604.

In sub-step 826: performing, by the eye tracking system 200, eye tracking in each of the at least one subsequent image 650 based on one or more of the at least one part of the eye comprised in the at least one second ROI 601, 602, 603, 604 depicted in each of the at least one subsequent image 650, respectively.

The eye tracking system 200 may correspondingly be configured to perform eye tracking in each of the at least one subsequent image 650 based on one or more of the at least one part of the eye comprised in the at least one second ROI 601, 602, 603, 604 depicted in each of the at least one subsequent image 650, respectively.

Eye detection and/or eye tracking may be performed in both the first image 500 and the second image 600.

The eye detection and/or eye tracking of the embodiments presented in connection with FIGS. 8A and 8B may be performed in accordance with any suitable embodiment described in the applicant's own previously filed Swedish patent application no.: 1951110-4, which is hereby incorporated in its entirety.

Further Embodiments

In one or more embodiment, there is provided a non-transitory computer-readable storage medium storing instructions which, when executed by processing circuitry 210 of the system 200, cause the system 200 to perform the method as defined in any of the method embodiments disclosed herein (in other words, in the claims, the summary, or the detailed description).

The non-transitory computer-readable storage medium may store instructions which, when executed by processing circuitry 210 of the system 200, cause the system 200 to: obtain, in the eye tracking system 200, a first image 500 comprising pixels captured using the image sensor device 110 at a current exposure setting, wherein the current exposure setting comprises a partial readout parameter PR having a value that correspond to a number, N, of image parts $I_{PART1 \ldots N}$ for partial readout by the image sensor device 110, the number of image parts, N, being an integer $\geq 1$; determine, by processing circuitry 210 in the eye tracking system 200, an intensity value $I_1$ of the first image 500; compare, by the processing circuitry 210, the intensity value $I_1$ of the first image 500 to a preset desired intensity value $I_{des}$; and, if the intensity value $I_1$ of the first image 500 differs more than a preset allowed deviation d from the preset desired intensity value $I_{des}$: determine, by the processing circuitry 210, an updated number, $N_{updated}$, of image parts for partial readout by the image sensor device 110 based on the current number of image parts and the intensity value $I_1$ of the first image 500, the updated number of image parts, $N_{updated}$ being an integer $\geq 1$; and update, by the processing circuitry 210, the current exposure setting by setting the value of the partial readout parameter PR to the updated number, $N_{updated}$, of image parts.

In one or more embodiments, the non-transitory computer-readable storage medium may store instructions which, when executed by processing circuitry 210 of the system 200, cause the system 200 to perform the method defined in any of the method embodiments described herein. In some embodiments, the non-transitory computer-readable storage medium may further store instructions which, when executed by processing circuitry 210 of the system 200, cause the system 200 to perform the method defined in any of the method embodiments repeatedly. Repeatedly may in this context be understood as being performed for every image frame captured by the image sensor device 110, at a preset time interval, for every second, third, fourth etc. captured image frame, or at another suitably selected preset interval.

The non-transitory computer-readable storage medium may be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments described herein.

As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the method embodiments described above with reference to FIGS. 5, 6, 7, 8A and 8B may, as explained herein, be combined with additional method steps to form further embodiments. Further, it will be appreciated that the system 200 shown in FIG. 2 is merely intended as an example, and that other systems may also perform the methods described above with reference to FIGS. 5, 6, 7, 8A and 8B.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A computer implemented method for controlling the exposure settings of an image sensor device associated with an eye tracking system, the image sensor device being a rolling shutter image sensor device with global reset comprising an image sensor of i*j pixels, the method comprising:

obtaining, in the eye tracking system, a first image comprising i*j pixels captured using the image sensor device at a current exposure setting, wherein the current exposure setting comprises a partial readout parameter, PR, having a value that corresponds to a number, N, of image parts, $I_{PART(1 \ldots N)}$, for partial readout by the image sensor device, the number of image parts, N, being an integer $\geq 1$;

determining, by processing circuitry in the eye tracking system, an intensity value, $I_1$, of the first image;

comparing, by the processing circuitry, the intensity value, $I_1$, of the first image to a preset desired intensity value, $I_{des}$; and if the intensity value, $I_1$, of the first image differs more than a preset allowed deviation, d, from the preset desired intensity value, $I_{des}$:

determining, by the processing circuitry, an updated number, $N_{updated}$, of image parts for partial readout by the image sensor device based on the current number of image parts and the intensity value, $I_1$, of the first image, the updated number of image parts, $N_{updated}$ being an integer $\geq 1$; and updating, by the processing circuitry, the current exposure setting by setting the value of the partial readout parameter, PR, to the updated number, $N_{updated}$, of image parts.

2. The method of claim 1, further comprising performing the method steps of claim 1 repeatedly until the intensity value, $I_1$, of the first image is within the preset allowed deviation, d, from the preset desired intensity value, $I_{des}$.

3. The method of claim 1, wherein the method further comprises:

reading out a number of image parts, $I_{PART(1 \ldots N)}$, one at a time, by the image sensor device, wherein the number of image parts corresponds to the value of the partial readout parameter, PR; and generating a second image by combining, by the processing circuitry, the read out image parts, $I_{PART(1 \ldots N)}$, into a combined image of i*j pixels.

4. The method of claim 1, wherein the determining, by the processing circuitry, the updated number, $N_{updated}$, of image parts for partial readout by the image sensor device based on the current number of image parts and the intensity value, $I_1$, of the first image comprises:

obtaining, by the processing circuitry, a factor $\alpha$, the factor $\alpha$ being a numeric value; and if $I_{des} > I_1$, setting, by the processing circuitry, the updated number, $N_{updated}$, of image parts to: $N_{updated}$=round (N*$\alpha$); or if $I_{des} < I_1$, setting, by the processing circuitry, the updated number, $N_{updated}$, of image parts to: $N_{updated}$=round(N/$\alpha$).

5. The method of claim 1, wherein the determining, by the processing circuitry, the updated number, $N_{updated}$, of image parts for partial readout by the image sensor device based on the current number of image parts and the intensity value, $I_1$, of the first image comprises:
    determining, by the processing circuitry, a factor $\alpha = I_{des}/I_1$; and
    setting, by the processing circuitry, the updated number, $N_{updated}$, of image parts to: $N_{updated} = \text{round}(N*\alpha)$.

6. The method of claim 4, wherein obtaining the factor $\alpha$, by the processing circuitry, comprises receiving input indicative of the factor $\alpha$ via a user input device.

7. The method of claim 4, wherein obtaining the factor $\alpha$, by the processing circuitry, comprises receiving or retrieving a preset factor $\alpha$ from a memory comprised in or communicatively connected to the eye tracking system.

8. The method of claim 1, wherein determining the intensity value, $I_1$, of the first image comprises setting, by the processing circuitry, the intensity value, $I_1$, of the first image to the $X^{th}$ percentile of a histogram of the intensities of the first image, X being a preset percentage between 0% and 100%.

9. The method of claim 1, wherein the image parts, $I_{PART(1 \ldots N)}$, are non-overlapping.

10. An eye tracking system configured to control the exposure settings of an image sensor device, the system comprising:
    an image sensor device in the form of a rolling shutter image sensor device with global reset comprising an image sensor of $i*j$ pixels, the image sensor device being configured to perform partial readouts; and
    processing circuitry;
    wherein the eye tracking system is configured to obtain a first image comprising $i*j$ pixels captured using the image sensor device at a current exposure setting, wherein the current exposure setting comprises a partial readout parameter, PR, having a value that correspond to a number, N, of image parts, $I_{PART(1 \ldots N)}$, for partial readout by the image sensor device, the number of image parts, N, being an integer $\geq 1$;
    wherein the processing circuitry is configured to:
    determine an intensity value, $I_1$, of the first image;
    compare the intensity value, $I_1$, of the first image to a preset desired intensity value, $I_{des}$; and
    if the intensity value, $I_1$, of the first image differs more than a preset allowed deviation, d, from the preset desired intensity value, $I_{des}$:
        determine an updated number, $N_{updated}$, of image parts for partial readout by the image sensor device based on the current number of image parts and the intensity value, $I_1$, of the first image, the updated number of image parts, $N_{updated}$ being an integer $\geq 1$; and
        update the current exposure setting by setting the value of the partial readout parameter, PR, to the updated number, $N_{updated}$, of image parts.

11. The eye tracking system of claim 10, further being configured to repeat the steps of:
    reading out a number of image parts, IPART (1 ... N), one at a time, by the image sensor device, wherein the number of image parts corresponds to the value of the partial readout parameter, PR; and
    generating a second image by combining, by the processing circuitry, the read out image parts, IPART(1 ... N), into a combined image of $i*j$ pixels until the intensity value, $I_1$, of the first image is within the preset allowed deviation, d, from the preset desired intensity value, $I_{des}$.

12. The eye tracking system of claim 10, wherein the image sensor device is further configured to read out a number of image parts, $I_{PART(1 \ldots N)}$, one at a time, wherein the number of image parts corresponds to the value of the partial readout parameter, PR; and wherein the processing circuitry is further configured to generate a second image by combining the read out image parts, $I_{PART(1 \ldots N)}$, into a combined image of $i*j$ pixels.

13. The eye tracking system of claim 10, wherein the processing circuitry is configured to determine the updated number, $N_{updated}$, of image parts for partial readout by the image sensor device based on the current number of image parts and the intensity value, $I_1$, of the first image by:
    obtaining a factor $\alpha$, the factor $\alpha$ being a numeric value; and
    if $I_{des} > I_1$, setting the updated number, $N_{updated}$, of image parts to: $N_{updated} = \text{round}(N*\alpha)$; or
    if $I_{des} < I_1$, setting the updated number, $N_{updated}$, of image parts to: $N_{updated} = \text{round}(N/\alpha)$.

14. The eye tracking system of claim 10, wherein the processing circuitry is configured to determine the updated number, $N_{updated}$, of image parts for partial readout by the image sensor device based on the current number of image parts and the intensity value, $I_1$, of the first image by:
    determining a factor $\alpha = I_{des}/I_1$; and
    setting the updated number, $N_{updated}$, of image parts to: $N_{updated} = \text{round}(N*\alpha)$.

15. The eye tracking system of claim 13, wherein the processing circuitry is configured to obtain the factor $\alpha$ by receiving input indicative of the factor $\alpha$ via a user input device.

16. The eye tracking system of claim 13, wherein the eye tracking system further comprises or is communicatively connected to a memory, wherein the processing circuitry is configured to obtain the factor $\alpha$ by receiving or retrieving a preset factor $\alpha$ from the memory.

17. The eye tracking system of claim 10, wherein the processing circuitry is configured to determine the intensity value, $I_1$, of the first image by setting it to the $X^{th}$ percentile of a histogram of the intensities of the first image, X being a preset percentage between 0% and 100%.

18. The eye tracking system of claim 10, wherein the image parts, $I_{PART(1 \ldots N)}$, are non-overlapping.

19. A non-transitory computer-readable storage medium storing instructions which, when executed by processing circuitry of an eye tracking system, cause the system to:
    obtain, in the eye tracking system, a first image comprising $i*j$ pixels captured using the image sensor device at a current exposure setting, wherein the current exposure setting comprises a partial readout parameter, PR, having a value that correspond to a number, N, of image parts, $I_{PART(1 \ldots N)}$, for partial readout by the image sensor device, the number of image parts, N, being an integer $\geq 1$;
    determine, by processing circuitry in the eye tracking system, an intensity value, $I_1$, of the first image;
    compare, by the processing circuitry, the intensity value, $I_1$, of the first image to a preset desired intensity value, $I_{des}$; and
    if the intensity value, $I_1$, of the first image differs more than a preset allowed deviation, d, from the preset desired intensity value, $I_{des}$:
        determine, by the processing circuitry, an updated number, $N_{updated}$, of image parts for partial readout by the image sensor device based on the current number of image parts and the intensity value, $I_1$, of the first image, the updated number of image parts, $N_{updated}$ being an integer $\geq 1$; and update, by the processing circuitry, the current exposure setting by setting the value of the partial readout parameter, PR, to the updated number, $N_{updated}$, of image parts.

20. The non-transitory computer-readable storage medium of claim 19, further storing instructions which, when executed by processing circuitry of a system, cause the system to perform the method steps of:

reading out a number of image parts, $I_{PART\,(1\,\ldots\,N)}$, one at a time, by the image sensor device, wherein the number of image parts corresponds to the value of the partial readout parameter, PR; and generating a second image by combining, by the processing circuitry, the read out image parts, $I_{PART(1\,\ldots\,N)}$, into a combined image of i*j pixels.

* * * * *